(12) United States Patent
Tomizawa et al.

(10) Patent No.: US 10,468,188 B2
(45) Date of Patent: Nov. 5, 2019

(54) CERAMIC ELECTRONIC COMPONENT AND METHOD OF PRODUCING THE SAME

(71) Applicant: Taiyo Yuden Co., Ltd., Tokyo (JP)

(72) Inventors: Yuji Tomizawa, Tokyo (JP); Wakae Akaishi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/723,699

(22) Filed: Oct. 3, 2017

(65) Prior Publication Data

US 2018/0108481 A1    Apr. 19, 2018

(30) Foreign Application Priority Data

Oct. 17, 2016 (JP) ................................ 2016-203457

(51) Int. Cl.
  *H01G 4/232* (2006.01)
  *H01G 4/12* (2006.01)
  *H01G 4/248* (2006.01)
  *H01G 4/30* (2006.01)

(52) U.S. Cl.
  CPC ......... *H01G 4/2325* (2013.01); *H01G 4/1245* (2013.01); *H01G 4/1227* (2013.01); *H01G 4/1236* (2013.01); *H01G 4/232* (2013.01); *H01G 4/248* (2013.01); *H01G 4/306* (2013.01)

(58) Field of Classification Search
  CPC ......... H01G 4/30; H01G 4/232; H01G 4/2325
  See application file for complete search history.

(56) References Cited

U.S. PATENT DOCUMENTS

| 2014/0043724 A1* | 2/2014 | Kang | ................. H01G 4/30 361/321.2 |
| 2017/0127521 A1* | 5/2017 | You | .................. H01G 4/005 |

FOREIGN PATENT DOCUMENTS

| JP | 2005159121 A | * | 6/2005 | |
| JP | 2013-091848 A | | 5/2013 | |
| JP | 2013207203 A | * | 10/2013 | |
| WO | WO-2013/111625 A1 | | 8/2013 | |
| WO | WO-2016133090 A1 | * | 8/2016 | ............... H01G 4/30 |

\* cited by examiner

*Primary Examiner* — Eric W Thomas
(74) *Attorney, Agent, or Firm* — Saliwanchik, Lloyd & Eisenschenk

(57) ABSTRACT

A ceramic electronic component includes a ceramic body and an external electrode. The external electrode is formed along a surface of the ceramic body and includes a tin layer as an outermost layer. The tin layer includes dispersed pores.

5 Claims, 11 Drawing Sheets

CERAMIC ELECTRONIC COMPONENT AND METHOD OF PRODUCING THE SAME

CROSS REFERENCE TO RELATED APPLICATIONS

This application claims the benefit of Japanese Priority Patent Applications 2016-203457 filed Oct. 17, 2016, the entire contents of which are incorporated herein by reference.

BACKGROUND

The present invention relates to a ceramic electronic component including external electrodes and to a method of producing the ceramic electronic component.

Along with use of lead-free electronic devices, there have also been demands for use of lead-free ceramic electronic components mounted to those electronic devices. Further, there has been another demand to improve mountability of the ceramic electronic components with use of tin-based lead-free solder. In order to meet such demands, it is effective to use the outermost layer of an external electrode of the ceramic electronic component as a tin layer.

An external electrode of a general ceramic electronic component includes a copper layer. However, it is known that the external electrode, in which a tin layer is formed on the copper layer, is likely to generate whiskers that grow like hairs from the tin layer. When the whiskers are separated from the tin layer and drop on a circuit board, this will be a cause of a short circuit of the circuit board.

It is thought that whiskers are generated when compressive stress is applied to the tin layer. In this regard, in the external electrode, an intermetallic compound containing tin and copper is likely to be generated at a boundary portion between the tin layer and the copper layer. The volume of such an intermetallic compound increases when generated, and thus the intermetallic compound applies compressive stress to the tin layer. It is thought that the above fact causes the generation of the whiskers in the tin layer.

WO 2013/111625 and Japanese Patent Application Laid-open No. 2013-91848 each disclose a technique capable of suppressing the generation of the whiskers in the tin layer. In the techniques disclosed in WO 2013/111625 and Japanese Patent Application Laid-open No. 2013-91848, a nickel layer is provided between the tin layer and the copper layer. With this configuration, the nickel layer hinders the tin layer and the copper layer from coming into contact with each other, and thus an intermetallic compound containing tin and copper can be prevented from being formed.

SUMMARY

However, a factor that applies compressive stress to the tin layer of the external electrode is not only in the generation of the intermetallic compound containing tin and copper. For example, due to impact or the like at production or transportation of the ceramic electronic component, compressive stress may be applied to the tin layer of the external electrode. In such a case, the techniques disclosed in WO 2013/111625 and Japanese Patent Application Laid-open No. 2013-91848 have difficulty in preventing the generation of the whiskers in the tin layer.

In view of the circumstances as described above, it is desirable to provide a technique for suppressing generation of whiskers in an external electrode that includes a tin layer as the outermost layer.

According to one embodiment of the present invention, there is provided a ceramic electronic component including a ceramic body and an external electrode.

The external electrode is formed along a surface of the ceramic body and includes a tin layer as an outermost layer, the tin layer including dispersed pores.

In this configuration, compressive stress applied to the tin layer due to various factors is relaxed by the pores dispersed in the tin layer. As a result, generation of whiskers in the tin layer is suppressed in the ceramic electronic component.

The external electrode may further include a copper layer that is adjacent to the inside of the tin layer.

In this configuration, an intermetallic compound is generated at a boundary portion between the tin layer and the copper layer. Thus, also when compressive stress is applied to the tin layer, the compressive stress is relaxed by the pores dispersed in the tin layer.

According to another embodiment of the present invention, there is provided a method of producing a ceramic electronic component, the method including: preparing a ceramic body; and forming an external electrode along a surface of the ceramic body.

The forming an external electrode includes forming a tin layer as an outermost layer of the external electrode by sputtering.

The tin layer may include dispersed pores.

The sputtering may include magnetron sputtering.

The forming an external electrode may include forming a copper layer before forming the tin layer.

In those configurations, the tin layer is formed by sputtering, and thus the tin layer including the dispersed pores can be quickly and easily obtained. In other words, in those configurations, it is possible to obtain a tin layer in which whiskers are difficult to be generated even when compressive stress is applied thereto.

The copper layer may be formed by sputtering.

In this configuration, forming the copper layer and forming the tin layer can be performed in a continuous process. This improves production efficiency of the ceramic electronic component.

The ceramic body may be subjected to reverse sputtering before forming the external electrode.

In this configuration, the surface of the ceramic body is cleaned by the reverse sputtering, and thus particularly favorable connectivity of the external electrode to the surface of the ceramic body is obtained.

Further, performing the reverse sputtering, forming the copper layer, and forming the tin layer can be performed in a continuous process. This improves production efficiency of the ceramic electronic component.

It is possible to provide a technique for suppressing generation of whiskers in an external electrode that includes a tin layer as the outermost layer.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. Multi-layer Ceramic Capacitor 10

1.1 Overall Configuration

Figure 1:
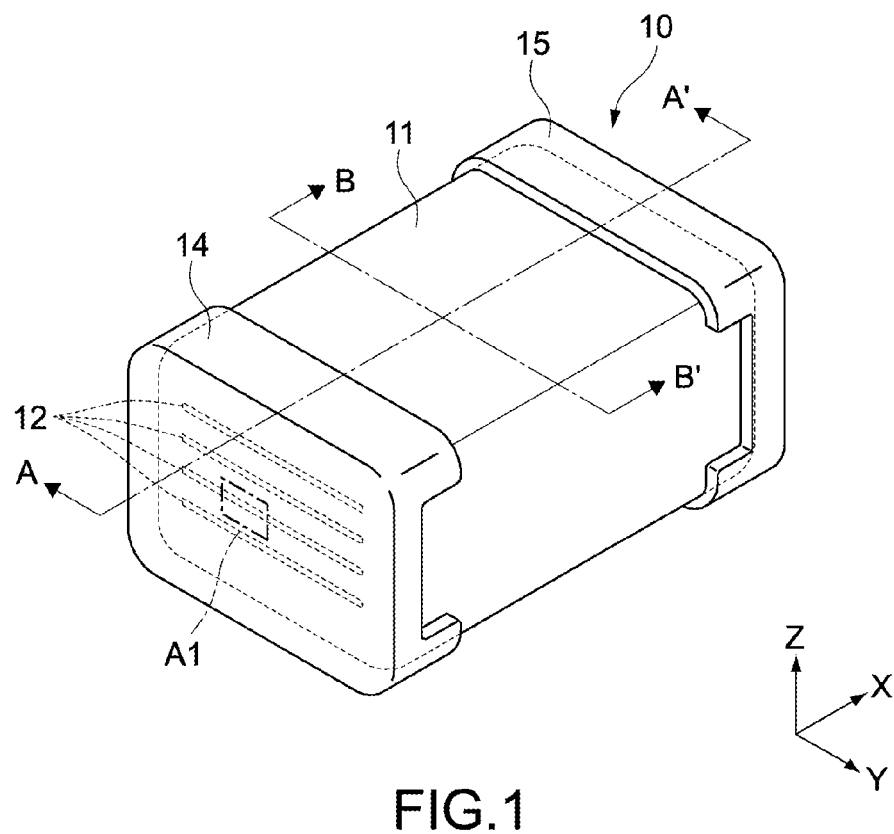
FIG. 1 is a perspective view of a multi-layer ceramic capacitor according to one embodiment of the present invention.
Figure 2:
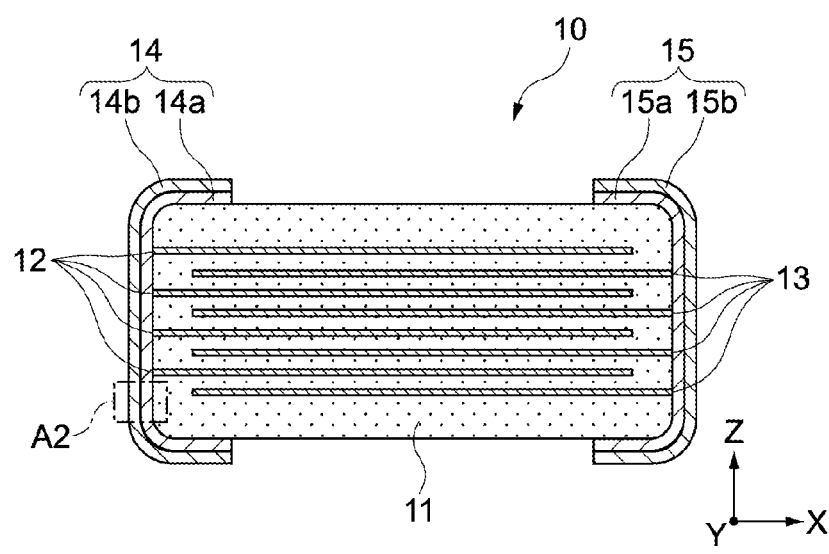
FIG. 2 is a cross-sectional view of the multi-layer ceramic capacitor taken along the A-A' line in FIG. 1.
Figure 3:
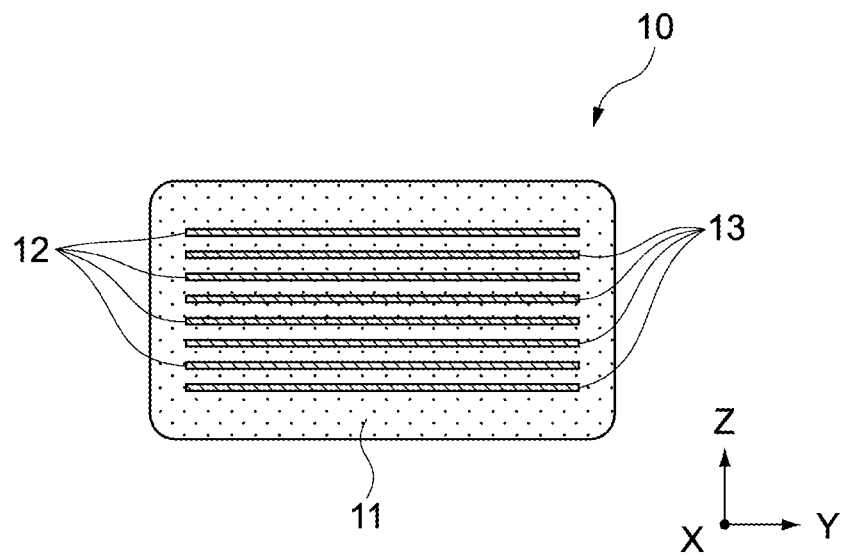
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention.

FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15.

The ceramic body 11 has a hexahedral shape having two end surfaces oriented in an X-axis direction, two side surfaces oriented in a Y-axis direction, and two main surfaces oriented in a Z-axis direction. In the ceramic body 11, for example, a dimension in the X-axis direction can be set to 1.0 mm and dimensions in the Y- and Z-axis directions can be set to 0.5 mm.

It should be noted that the ceramic body 11 may not have the hexahedral shape in a precise sense. For example, the surfaces of the ceramic body 11 may be curved surfaces, and the ceramic body 11 may be rounded as a whole.

The first external electrode 14 and the second external electrode 15 cover both the end surfaces of the ceramic body 11 and face each other in the X-axis direction with the ceramic body 11 therebetween. The first external electrode 14 and the second external electrode 15 are each formed from a good conductor of electricity and function as terminals of the multi-layer ceramic capacitor 10.

The first external electrode 14 and the second external electrode 15 extend from the respective end surfaces of the ceramic body 11 to the main surfaces thereof and slightly wrap around the side surfaces. The first external electrode 14 and the second external electrode 15 are apart from each other with an interval therebetween on the main surfaces and the side surfaces of the ceramic body 11. As a result, when viewed from the side surface of the ceramic body 11, the first external electrode 14 and the second external electrode 15 have a U shape. Cross sections of the first external electrode 14 and the second external electrode 15, which are parallel to an X-Z plane, also have a U shape.

It should be noted that the shape of the first external electrode 14 and the second external electrode 15 is not limited to the above shape. For example, the first external electrode 14 and the second external electrode 15 may extend from the respective end surfaces of the ceramic body 11 to only one of the main surfaces thereof, and cross sections of the first external electrode 14 and the second external electrode 15, which are parallel to the X-Z plane, may have an L shape.

1.2 Ceramic Body 11

The ceramic body 11 is made of dielectric ceramics. The ceramic body 11 includes first internal electrodes 12 and second internal electrodes 13 that are covered with dielectric ceramics. The first internal electrodes 12 and the second internal electrodes 13 each have a sheet-like shape extending along the X-Y plane and are alternately disposed along the Z-axis direction.

In other words, each of the first internal electrodes 12 face each of the second internal electrodes 13 in the Z-axis direction with a dielectric ceramic layer being sandwiched therebetween. Further, the first internal electrodes 12 are connected to the first external electrode 14 and are apart from the second external electrode 15. To the contrary, the second internal electrodes 13 are connected to the second external electrode 15 and are apart from the first external electrode 14.

The first internal electrodes 12 and the second internal electrodes 13 are each formed from a good conductor of electricity and function as internal electrodes of the multi-layer ceramic capacitor 10. Examples of the good conductor of electricity forming the first internal electrodes 12 and the second internal electrodes 13 include a metal mainly containing nickel (Ni), copper (Cu), palladium (Pd), platinum (Pt), silver (Ag), gold (Au), or the like, and an alloy of those metals.

In the ceramic body 11, in order to increase capacitances of the respective dielectric ceramic layers provided between the first and second internal electrodes 12 and 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

Further, examples of the dielectric ceramics forming the ceramic body 11 may also include a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($CaZr_xTi_{1-x}O_3$) based material, a barium zirconate ($BaZrO_3$) based material, and a titanium oxide ($TiO_2$) based material, in addition to the barium titanate based material.

It should be noted that the configuration of the multi-layer ceramic capacitor 10 is not limited to a specific configuration, and a well-known configuration can be used as appropriate in accordance with the size and performance expected for the multi-layer ceramic capacitor 10. For example, the number of first internal electrodes 12 and second internal electrodes 13 in a capacitance forming unit 16 can be determined as appropriate.

1.3 First External Electrode 14 and Second External Electrode 15

The first external electrode 14 has a two-layer structure including an internal layer 14a made of copper (Cu) and an external layer 14b made of tin (Sn). The second external electrode 15 has a two-layer structure including an internal layer 15a made of copper (Cu) and an external layer 15b made of tin (Sn). The internal layer 14a and the internal layer 15a are provided on the ceramic body 11. The external layer 14b and the external layer 15b are provided on the internal layer 14a and the internal layer 15a, respectively, and are the outermost layers forming the surfaces of the first external electrode 14 and the second external electrode 15, respectively.

In the external layers 14b and 15b made of tin, favorable wettability in tin-based lead-free solder is obtained. As a result, the external layer 14b and the external layer 15b are provided as the outermost layers of the first external electrode 14 and the second external electrode 15, respectively, so that the tin-based lead-free solder is easily wet-spread on the first external electrode 14 and the second external electrode 15 without gaps when the multi-layer ceramic capacitor 10 is mounted. This improves mountability of the multi-layer ceramic capacitor 10.

The thickness of each of the external layers 14b and 15b is desirably set to 1 μm or more and 10 μm or less. When the thickness of each of the external layers 14b and 15b is set to 1 μm or more, high wettability in the tin-based lead-free solder is efficiently obtained. Further, when the thickness of each of the external layers 14b and 15b is set to 10 μm or less, mass productivity capable of forming films for a short time is improved. From a similar standpoint, the thickness of each of the external layers 14b and 15b is further desirably set to 4 μm or more and 5 μm or less.

More detailed configurations of the first external electrode 14 and the second external electrode 15 will be described with reference to FIGS. 4 and 5.

Figure 4:
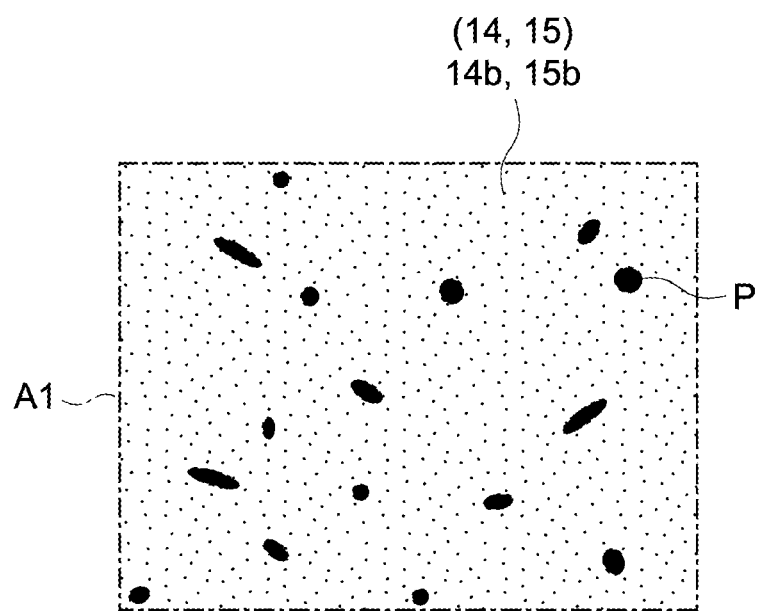
FIG. 4 is an enlarged partial plan view of an area A1 of the multi-layer ceramic capacitor shown in FIG. 1.

FIG. 4 is an enlarged schematic view of an area A1 surrounded by a chain line shown in FIG. 1. In other words, FIG. 4 shows a part of the surface of the external layer 14b of the first external electrode 14.

Figure 5:
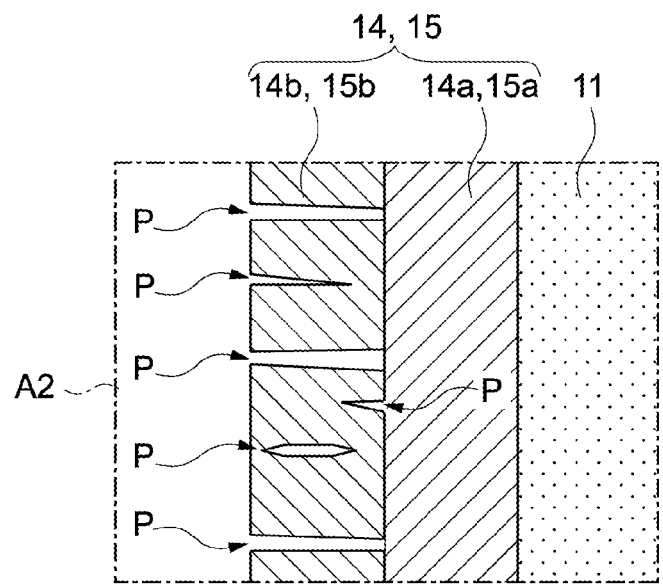
FIG. 5 is an enlarged partial cross-sectional view of an area A2 of the multi-layer ceramic capacitor shown in FIG. 2.

FIG. 5 is a schematic view of an area A2 surrounded by a chain line shown in FIG. 2. In other words, FIG. 5 shows a part of a cross section of the first external electrode 14.

It should be noted that the second external electrode 15 has configurations similar to those of the first external electrode 14, and thus the second external electrode 15 also has the configurations shown in FIGS. 4 and 5. As a result, FIGS. 4 and 5 also show reference symbols of the configurations of the second external electrode 15 in addition to reference symbols of the configurations of the first external electrode 14.

As shown in FIGS. 4 and 5, the external layers 14b and 15b of the first external electrode 14 and the second external electrode 15 include a plurality of pores P forming minute spaces. As shown in FIG. 4, the pores P are dispersed along the surfaces of the external layers 14b and 15b. Further, as shown in FIG. 5, the pores P have various cross-sectional shapes.

In the external layers 14b and 15b, for example, there are pores P recessed in a concave manner, pores P penetrating in the X-axis direction, pores P closed over the entire circumference, and the like. It should be noted that the pores P formed in the external layers 14b and 15b are not limited to have the shapes as shown in FIGS. 4 and 5. The pores P only need to form minute spaces in the external layers 14b and 15b.

The method of respectively forming the external layer 14b and the external layer 15b of the first external electrode 14 and the second external electrode 15 is not limited to a specific method. For example, using sputtering to form the external layers 14b and 15b can quickly and easily provide the external layers 14b and 15b each having a configuration in which the pores P are dispersed. Details of the method of forming the first external electrode 14 and the second external electrode 15 by sputtering will be described later.

Figure 6:
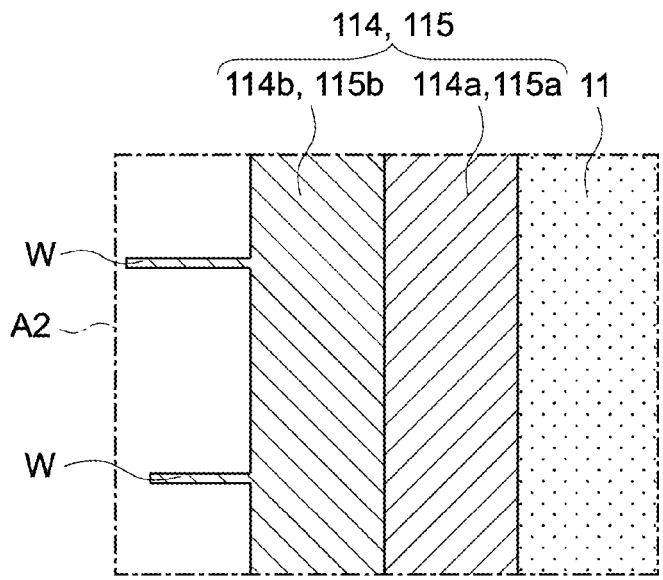
FIG. 6 is a partial cross-sectional view showing a state where compressive stress is applied to an external electrode according to a comparative example of the embodiment.

Here, as shown in FIG. 6, external electrodes 114 and 115 respectively including external layers 114b and 115b in which pores P are not dispersed are assumed. When compressive stress is applied to the external layers 114b and 115b made of tin, whiskers W are generated. Each of the whiskers W is tin crystal that grows like a hair from the surfaces of the external layers 114b and 115b. The whiskers W may grow up to several hundred μm.

When the whiskers W are separated from the external layers 114b and 115b and drop, various failures may occur in an electronic device to which the multi-layer ceramic capacitor 10 is mounted. As an example of such a situation, there is a case where, since the whiskers W made of tin have electrical conductivity, the whiskers W that drop on a circuit board of the electronic device cause a short circuit of the circuit board.

Due to various factors, compressive stress is applied to the external layers 114b and 115b of the external electrodes 114 and 115. For example, due to impact at production or transportation, generation of intermetallic compounds at boundary portions between the external layers 114b and 115b and internal layers 114a and 115a, or the like, compressive stress is applied to the external layers 114b and 115b of the external electrodes 114 and 115.

Figure 7:
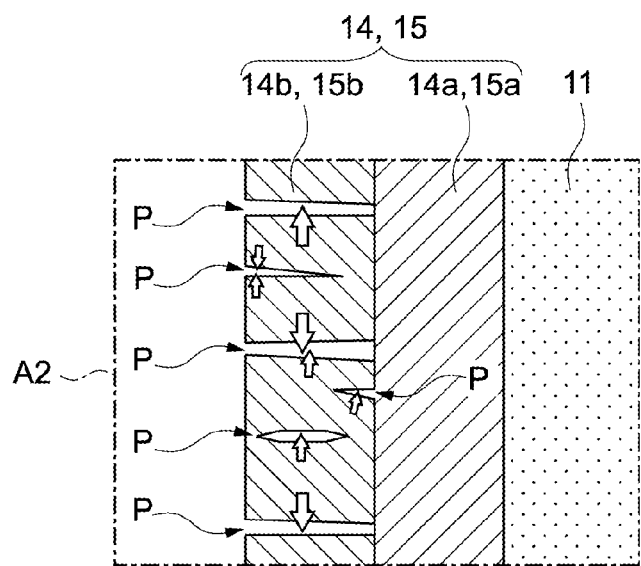
FIG. 7 is a partial cross-sectional view showing a state where compressive stress is applied to an external electrode of the multi-layer ceramic capacitor.

Meanwhile, also in the first external electrode 14 and the second external electrode 15 according to this embodiment shown in FIG. 7, similarly to the external electrodes 114 and 115 shown in FIG. 6, due to impact at production or transportation, generation of intermetallic compounds at boundary portions between the external layers 14b and 15b and the internal layers 14a and 15a, or the like, compressive stress is applied to the external layers 14b and 15b.

However, the compressive stress applied to the external layers 14b and 15b is relaxed by the pores P dispersed in the external layers 14b and 15b as schematically shown by block arrows in FIG. 7. As a result, the whiskers W are difficult to be generated in the external layers 14b and 15b of the first external electrode 14 and the second external electrode 15 according to this embodiment.

As described above, in the first external electrode 14 and the second external electrode 15 according to this embodiment, it is possible to suppress the generation of the whiskers W in the external layers 14b and 15b. Therefore, in the first external electrode 14 and the second external electrode 15, the suppression of the generation of the whiskers W can be achieved without providing a new configuration. This can prevent a fault such as a short circuit of a circuit board, which results from the generation of the whiskers W.

It should be noted that the first external electrode 14 and the second external electrode 15 may have a configuration in which the internal layers 14a and 15a are formed of a material other than copper, or a configuration in which intermediate layers are formed between the internal layers 14a and 15a and the external layers 14b and 15b, for example.

Examples of the material other than copper that forms the internal layers 14a and 15a include a metal mainly containing nickel, palladium, platinum, silver, gold, or the like, and an alloy of those metals. Further, examples of the material forming the intermediate layers between the internal layers 14a and 15a and the external layers 14b and 15b include a metal mainly containing nickel, platinum, palladium, gold, or the like, and an alloy of those metals.

Further, in each of the external layer 14b and the external layer 15b of the first external electrode 14 and the second external electrode 15, because of the dispersion of the pores P, a contact area with solder is increased when the multi-layer ceramic capacitor 10 is mounted. As a result, in the multi-layer ceramic capacitor 10, a mounting temperature can be kept low and a mounting time can be shortened.

The configurations of the first external electrode 14 and the second external electrode 15 can be favorably determined except for the configuration including the external layers 14b and 15b that are made of tin and formed as the outermost layers.

For example, the number of layers forming the first external electrode 14 and the second external electrode 15 can be determined as appropriate. As one example, the first external electrode 14 and the second external electrode 15 may include a contact metal layer for improving connectivity with the ceramic body 11, between the ceramic body 11 and the internal layers 14a and 15a. Further, the first external electrode 14 and the second external electrode 15 may be formed only of the external layer 14b and the external layer 15b, respectively.

1.4 Operation of Multi-layer Ceramic Capacitor 10

With the configuration described above, when a voltage is applied between the first external electrode 14 and the second external electrode 15 in the multi-layer ceramic capacitor 10, a voltage is applied to the dielectric ceramic layers between the first internal electrodes 12 and the second internal electrodes 13. With this configuration, the multi-layer ceramic capacitor 10 stores charge corresponding to the voltage applied between the first external electrode 14 and the second external electrode 15.

2. Method of Producing Multi-layer Ceramic Capacitor 10

2.1 General Outline

A method of producing the multi-layer ceramic capacitor 10 according to this embodiment will be described.

Figure 8:
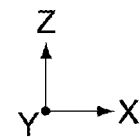
FIG. 8 is a perspective view showing a production process of the multi-layer ceramic capacitor.

First, an unsintered ceramic body 111 shown in FIG. 8 is produced. For example, the ceramic body 111 is obtained by laminating a plurality of ceramic sheets in the Z-axis direction and being subjected to thermocompression bonding. An electrical conductive paste is previously printed in a predetermined pattern on the plurality of ceramic sheets, and thus internal electrodes 112 and 113 can be disposed.

Figure 9:
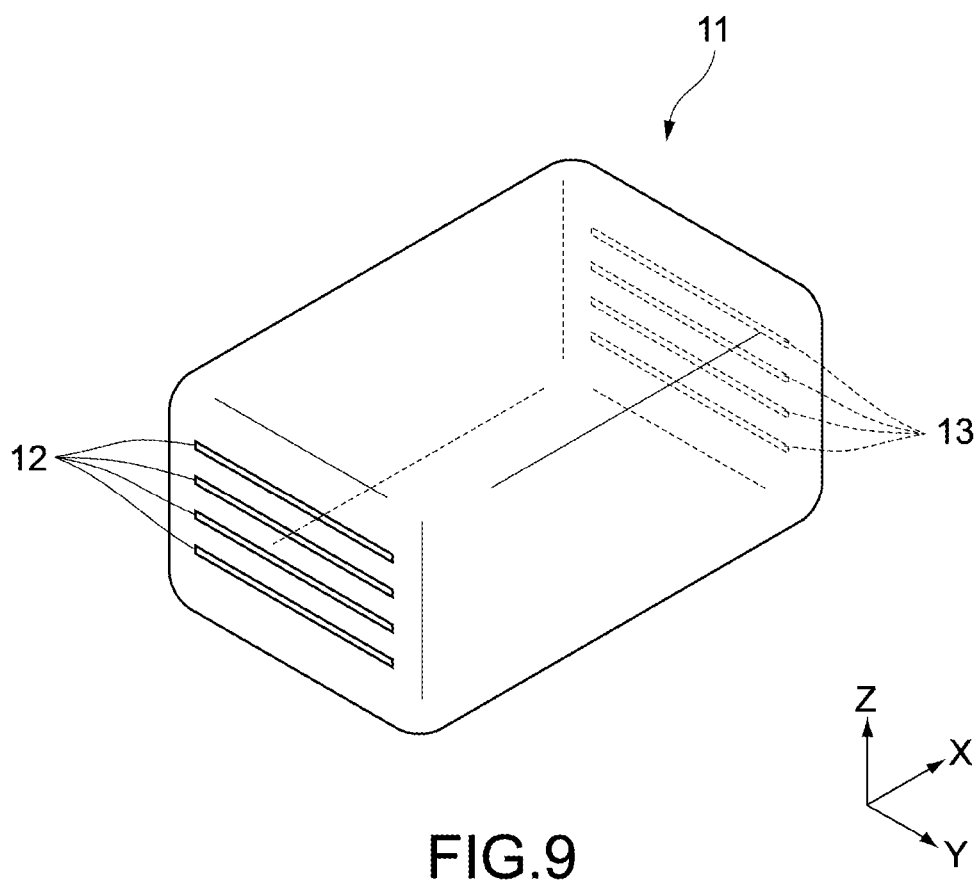
FIG. 9 is a perspective view showing a production process of the multi-layer ceramic capacitor.

Next, the ceramic body 111 is sintered. Sintering of the ceramic body 111 can be performed in a reduction atmosphere or a low-oxygen partial pressure atmosphere, for example. Thus, the ceramic body 11 shown in FIG. 9 is obtained. Subsequently, the first external electrode 14 and the second external electrode 15 are formed on the surface of the ceramic body 11.

As described above, for formation of the external layer 14b and the external layers 15b of the first external electrode 14 and the second external electrode 15, sputtering is performed. Thus, the external layers 14b and 15b including the dispersed pores P can be quickly and easily obtained. In sputtering, adjusting a condition such as a deposition rate can control the amount of pores P in the external layers 14b and 15b.

A type of sputtering used to form the external layers 14b and 15b can be selected from known methods as appropriate. However, magnetron sputtering is desirably used to form the external layers 14b and 15b. Thus, the external layers 14b and 15b in which the pores P are particularly favorably dispersed are obtained.

As a comparative example, the external layers 114b and 115b in which the pores P are not dispersed, which are shown in FIG. 6, were formed by a deposition method and a plating method. Density was then measured for the external layers 14b and 15b formed by sputtering and for the external layers 114b and 115b formed by the deposition method and the plating method, by using X-ray fluorescence.

As a result of the measurement, the external layers 14b and 15b formed by sputtering had the density that is approximately 70 to 75% of the external layers 114b and 115b formed by the deposition method and the plating method. Further, the generation of the whiskers W was observed in the external layers 114b and 115b formed by the deposition method and the plating method, whereas the generation of the whiskers W was not observed in the external layers 14b and 15b formed by sputtering.

Hereinafter, specific examples of the method of forming the first external electrode 14 and the second external electrode 15 will be described, but the method of forming the first external electrode 14 and the second external electrode 15 is not limited to those specific examples.

2.2 Example 1 of Forming First External Electrode 14 and Second External Electrode 15

Figure 10:
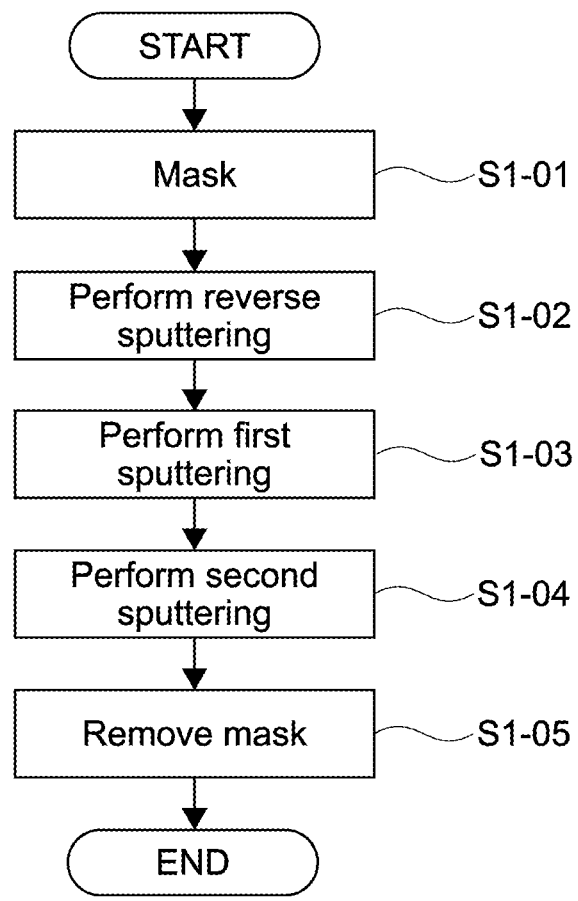
FIG. 10 is a flowchart showing Example 1 of forming the external electrodes of the multi-layer ceramic capacitor.
Figure 11A:
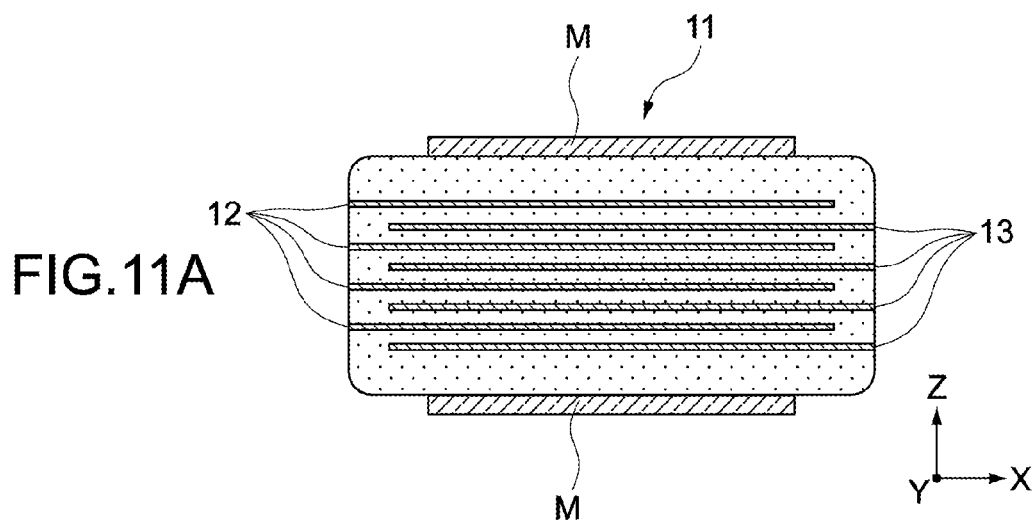
FIGS. 11A, 11B, and 11C are cross-sectional views showing the process of Example 1 of forming the external electrodes of the multi-layer ceramic capacitor.
Figure 11B:
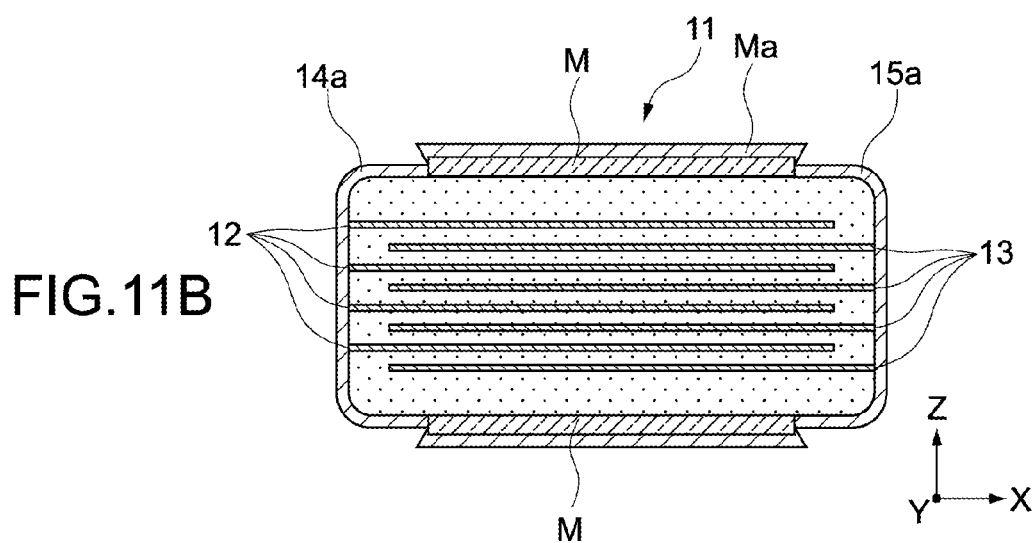
Figure 11C:
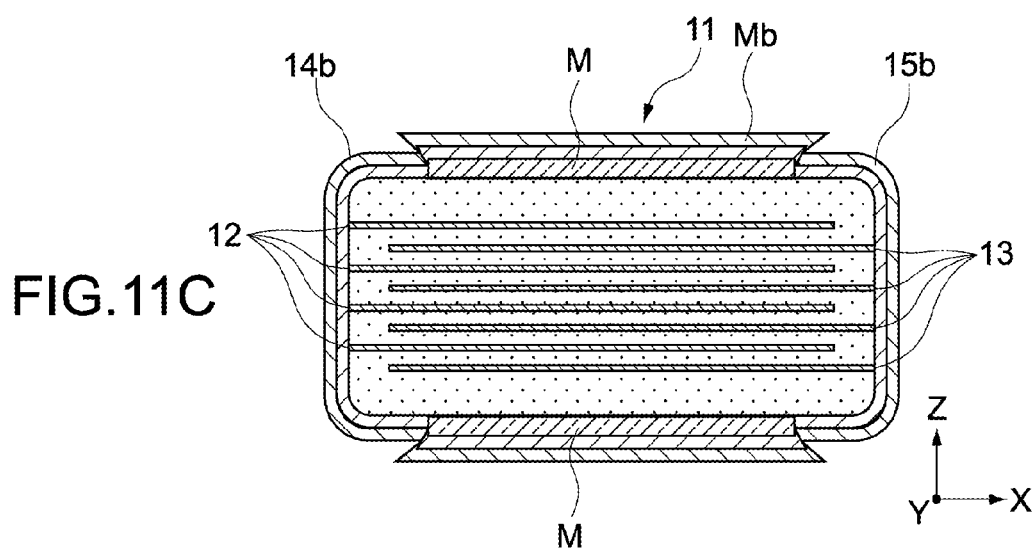

FIG. 10 is a flowchart showing Example 1 of forming the first external electrode 14 and the second external electrode 15. FIGS. 11A, 11B, and 11C are cross-sectional views showing the process of Example 1 of forming the first external electrode 14 and the second external electrode 15. Hereinafter, Example 1 of forming the first external electrode 14 and the second external electrode 15 will be described along FIG. 10 with reference to FIGS. 11A, 11B, and 11C as appropriate.

First, a mask M shown in FIG. 11A is disposed, on the surface of the ceramic body 11, in an area where the first external electrode 14 and the second external electrode 15 are not to be formed (Step S1-01).

Next, the ceramic body 11 on which the mask M is disposed is set in a chamber of a sputtering device and is subjected to reverse sputtering (Step S1-02).

Subsequently, first sputtering using copper targets is performed on the ceramic body 11 after subjected to the reverse sputtering, to form the internal layers 14a and 15a shown in FIG. 11B (Step S1-03). At that time, an internal layer Ma is also formed on the mask M.

Since the surface of the ceramic body 11 is cleaned by the reverse sputtering, in the first sputtering, particularly favorable connectivity of the internal layers 14a and 15a to the ceramic body 11 is obtained. This prevents gaps from being generated between the ceramic body 11 and the internal layers 14a and 15a, so that a multi-layer ceramic capacitor 10 having high moisture resistance can be produced.

It should be noted that the method of cleaning the surface of the ceramic body 11 is not limited to the reverse sputtering and may be ion beam irradiation, for example.

Second sputtering using tin targets is then performed on the ceramic body 11 after subjected to the first sputtering, to form the external layers 14b and 15b shown in FIG. 11C (Step S1-04). At that time, an external layer Mb is also formed on the mask M.

Finally, the mask M is removed from the ceramic body 11 (Step S1-05). At that time, the internal layer Ma and the external layer Mb are also removed together with the mask M.

Through the above steps, the multi-layer ceramic capacitor 10 shown in FIGS. 1 to 3 is obtained.

In Example 1 of forming the first external electrode 14 and the second external electrode 15, sputtering is directly performed on the surface of the ceramic body 11, the surface being formed of particles each having 50 to 250 nm. Thus, the crystal forming the internal layers 14a and 15a and the external layers 14b and 15b becomes columnar crystal extending in a thickness direction. Further, a growth direction of the whiskers W in the external layers 14b and 15b is a thickness direction of the external layers 14b and 15b.

In other words, the orientation of the columnar crystal forming the internal layers 14a and 15a and the external layers 14b and 15b is matched with the growth direction of the whiskers W in the external layers 14b and 15b. Therefore, assuming a case where there are no pores P as shown in FIG. 5 in the external layers 14b and 15b, the whiskers W are more likely to be generated.

However, if the pores P are dispersed, the generation of the whiskers W can be sufficiently suppressed also in the external layers 14b and 15b formed of the columnar crystal. In other words, in a sputtering film made of tin formed of the columnar crystal, many whiskers W are generated unless the pores P are dispersed as in the present invention.

Further, in Example 1 of forming the first external electrode 14 and the second external electrode 15, Step S1-02 (reverse sputtering), Step S1-03 (first sputtering), and Step S1-04 (second sputtering) can be performed in a continuous process without taking the ceramic body 11 out of the chamber. This improves production efficiency of the multi-layer ceramic capacitor 10.

Furthermore, in Example 1 of forming the first external electrode 14 and the second external electrode 15, the first external electrode 14 and the second external electrode 15 are obtained by only a dry process without using a wet process such as a plating method. Therefore, since waste water or the like is not generated, an environmental load can be reduced. Additionally, in the multi-layer ceramic capacitor 10, faults resulting from hydrogen absorption, infiltration or adherence of a plating solution, and the like do not occur.

It should be noted that in Example 1 of forming the first external electrode 14 and the second external electrode 15, it is not indispensable to perform Steps S1-02 to S1-04 as a continuous process, and the ceramic body 11 may be taken out from the chamber in each of Steps S1-02 to S1-04. Further, Step S1-02 (reverse sputtering) may be omitted as appropriate.

2.3 Example 2 of Forming First External Electrode 14 and Second External Electrode 15

Figure 12:
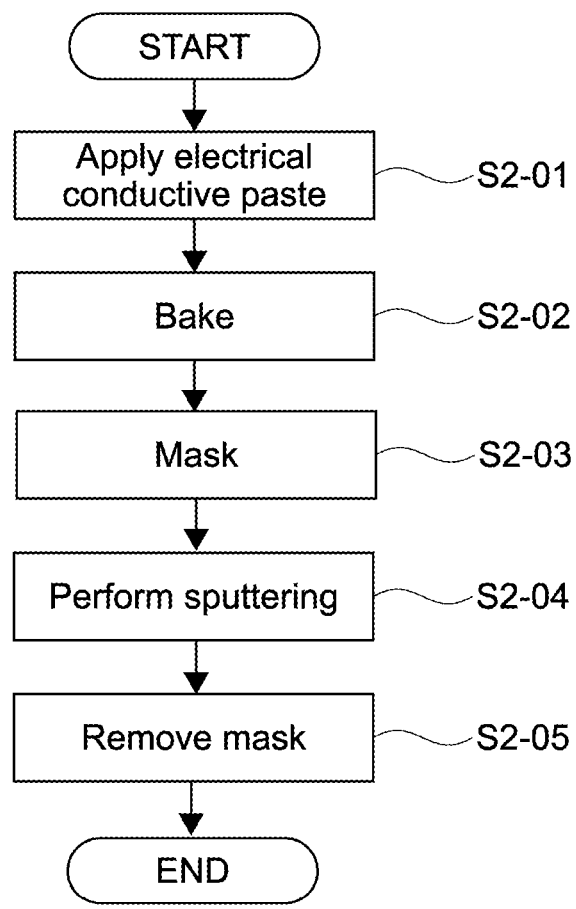
FIG. 12 is a flowchart showing Example 2 of forming the external electrodes of the multi-layer ceramic capacitor.
Figure 13A:
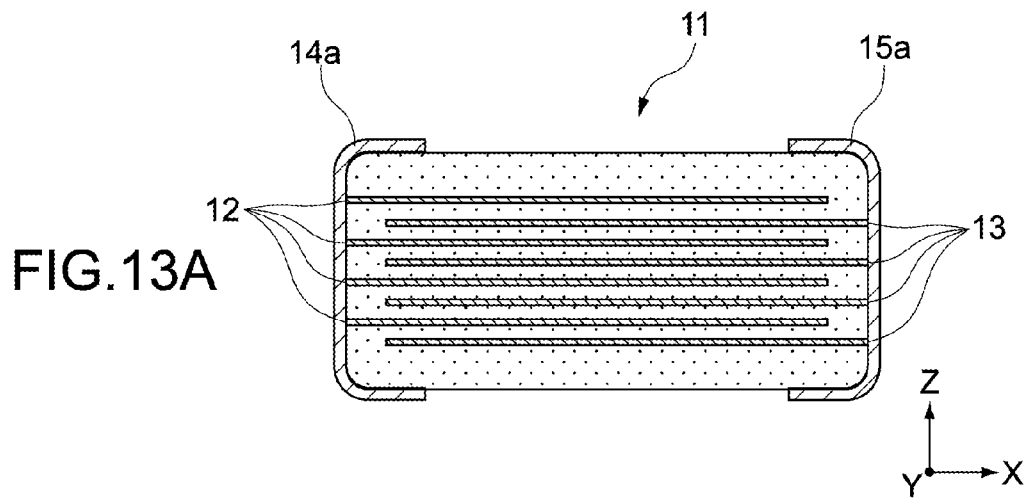
FIGS. 13A, 13B, and 13C are cross-sectional views showing the process of Example 2 of forming the external electrodes of the multi-layer ceramic capacitor.
Figure 13B:
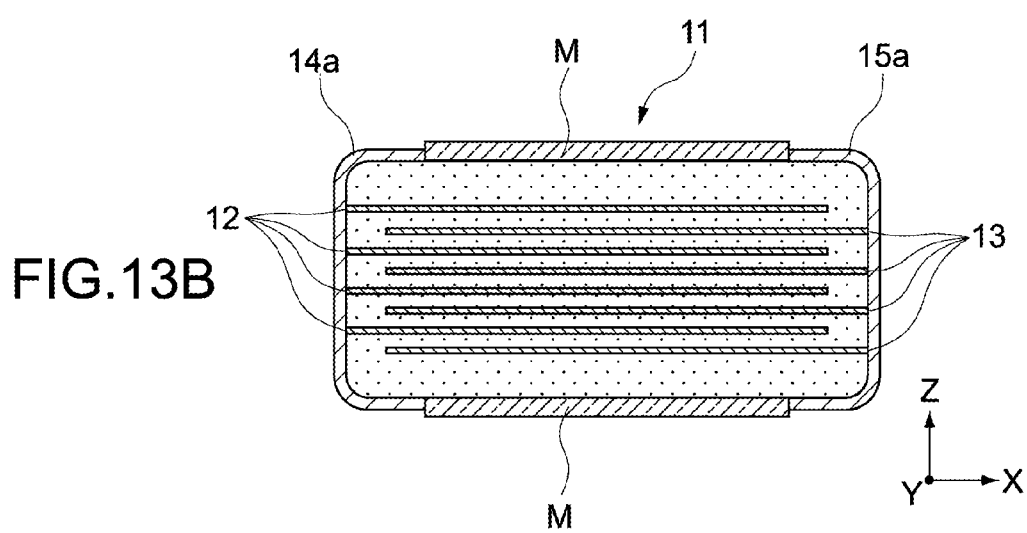
Figure 13C:
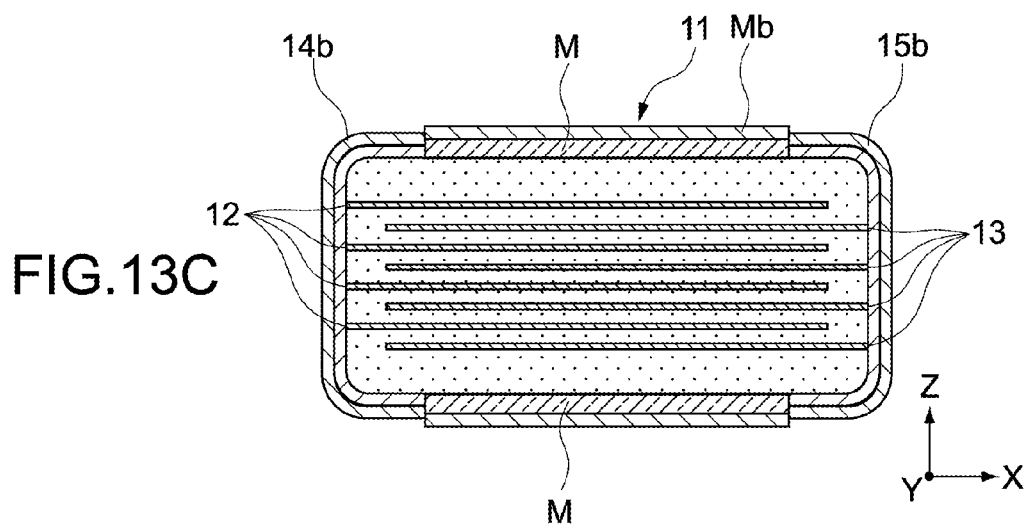

FIG. 12 is a flowchart showing Example 2 of forming the first external electrode 14 and the second external electrode 15. FIGS. 13A, 13B, and 13C are cross-sectional views showing the process of Example 2 of forming the first external electrode 14 and the second external electrode 15. Hereinafter, Example 2 of forming the first external electrode 14 and the second external electrode 15 will be described along FIG. 12 with reference to FIGS. 13A, 13B, and 13C as appropriate.

First, an electrical conductive paste is applied, on the surface of the ceramic body 11, to an area where the first external electrode 14 and the second external electrode 15 are formed (Step S2-01). For the method of applying the electrical conductive paste, for example, a dip method or printing method can be used.

The electrical conductive paste applied to the ceramic body 11 is then baked, to form the internal layers 14a and 15a shown in FIG. 13A (Step S2-02). Baking of the electrical conductive paste can be performed in a reduction atmosphere or a low-oxygen partial pressure atmosphere, for example.

Next, a mask M shown in FIG. 13B is disposed, on the surface of the ceramic body 11, in an area where the internal layers 14a and 15a are not formed (Step S2-03).

Subsequently, the ceramic body 11 on which the mask M is disposed is set in a chamber of a sputtering device and is subjected to second sputtering using tin targets, to form the external layers 14b and 15b shown in FIG. 13C (Step S2-04). At that time, an external layer Mb is also formed on the mask M.

Finally, the mask M is removed from the ceramic body 11 (Step S2-05). At that time, the external layer Mb is also removed together with the mask M.

Through the above steps, the multi-layer ceramic capacitor 10 shown in FIGS. 1 to 3 is obtained.

It should be noted that in Example 2 of forming the first external electrode 14 and the second external electrode 15, Step S2-01 (application of the electrical conductive paste) may be performed on the unsintered ceramic body 111 shown in FIG. 8. In this case, baking of the electrical conductive paste (Step S2-02) can be performed at the same time with sintering of the ceramic body 111.

Further, in Example 2 of forming the first external electrode 14 and the second external electrode 15, the electrical conductive paste is baked to form the internal layers 14a and 15a, but the method of forming the internal layers 14a and 15a can be changed as appropriate. Examples of other methods of forming the internal layers 14a and 15a include a plating method or a deposition method.

2.4 Example 3 of Forming First External Electrode 14 and Second External Electrode 15

Figure 14:
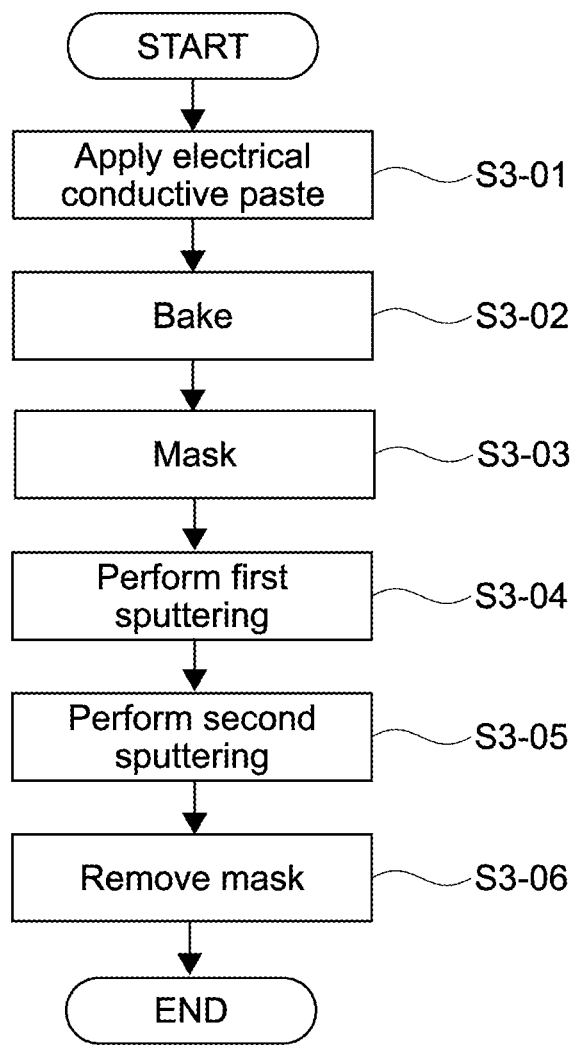
FIG. 14 is a flowchart showing Example 3 of forming the external electrodes of the multi-layer ceramic capacitor.
Figure 15A:
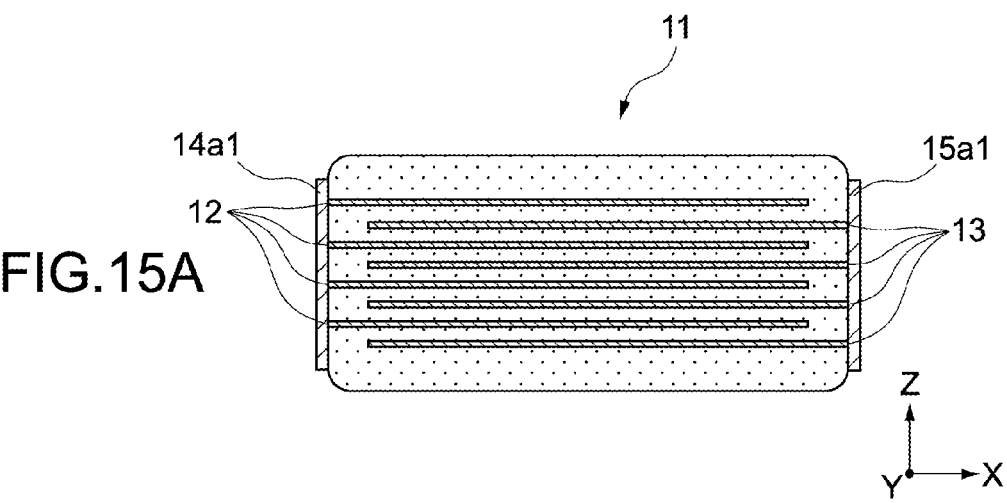
FIGS. 15A, 15B, and 15C are cross-sectional views showing the process of Example 3 of forming the external electrodes of the multi-layer ceramic capacitor.
Figure 15B:
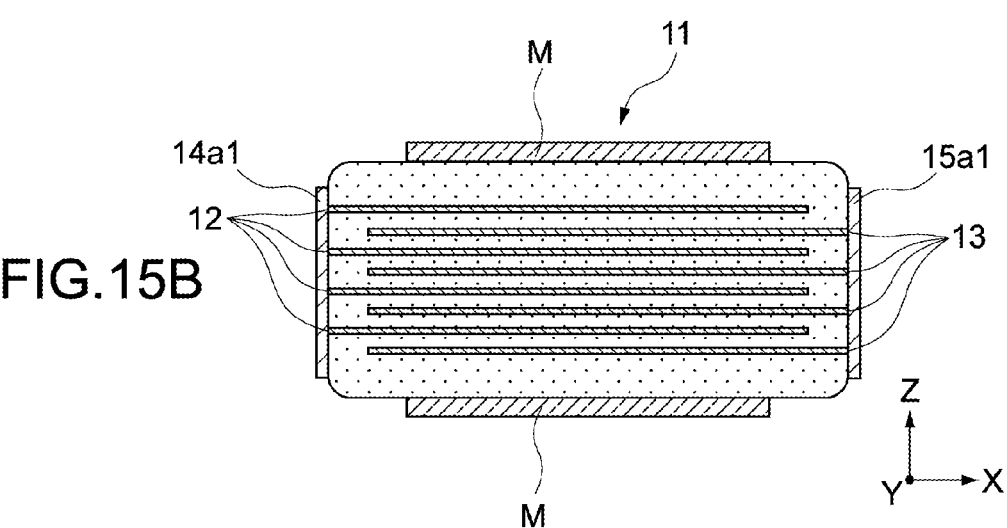
Figure 15C:
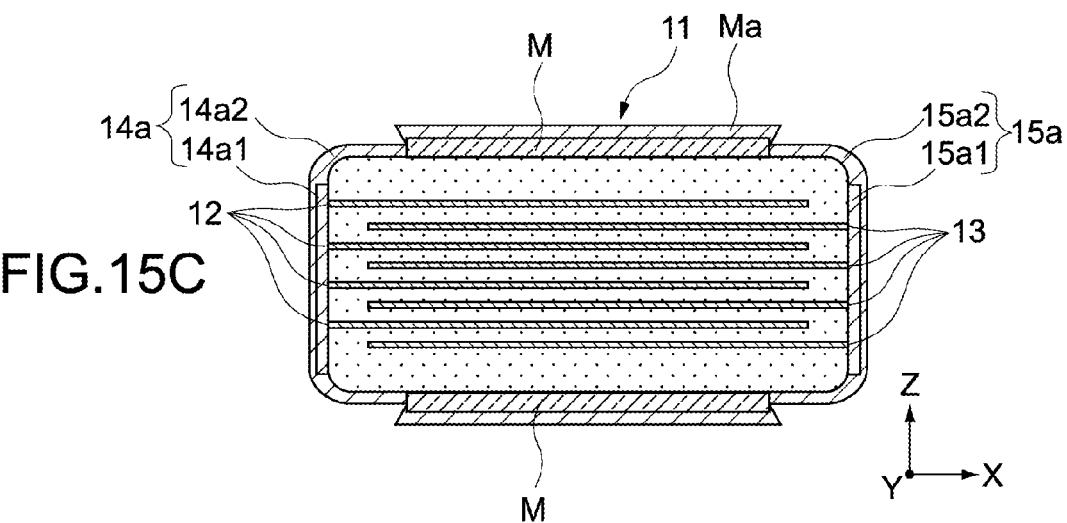

FIG. 14 is a flowchart showing Example 3 of forming the first external electrode 14 and the second external electrode 15. FIGS. 15A, 15B, and 15C are cross-sectional views showing the process of Example 3 of forming the first external electrode 14 and the second external electrode 15. Hereinafter, Example 3 of forming the first external electrode 14 and the second external electrode 15 will be described along FIG. 14 with reference to FIGS. 15A, 15B, and 15C as appropriate.

First, an electrical conductive paste is applied to end surfaces of the ceramic body 11, which are oriented in the X-axis direction and from which the first internal electrodes 12 and the second internal electrodes 13 are drawn (Step S3-01).

The electrical conductive paste applied to the ceramic body 11 is then baked, to form first internal layers 14a1 and 15a1 shown in FIG. 15A (Step S3-02).

Next, a mask M shown in FIG. 15B is disposed, on the surface of the ceramic body 11 on which the first internal layers 14a1 and 15a1 are formed, in an area where the first external electrode 14 and the second external electrode 15 are not to be formed (Step S3-03).

Subsequently, the ceramic body 11 on which the mask M is disposed is set in a chamber of a sputtering device and is subjected to first sputtering using copper targets, to form second internal layers 14a2 and 15a2 shown in FIG. 15C (Step S3-04). At that time, an internal layer Ma is also formed on the mask M.

Thus, the internal layer 14a including the first internal layer 14a1 and the second internal layer 14a2, and the internal layer 15a including the first internal layer 15a1 and the second internal layer 15a2 are obtained.

Second sputtering using tin targets is then performed on the ceramic body 11 after subjected to the first sputtering, to form the external layers 14b and 15b (Step S3-05).

Finally, the mask M is removed from the ceramic body 11 (Step S3-06). At that time, the internal layer Ma is also removed together with the mask M.

Through the above steps, the multi-layer ceramic capacitor 10 shown in FIGS. 1 to 3 is obtained.

In Example 3 of forming the first external electrode 14 and the second external electrode 15, the electrical conductive paste is baked onto the ceramic body 11 before subjected to the first sputtering, to form the first internal layers 14a1 and 15a1. This improves connectivity of the first external electrode 14 and the second external electrode 15 to the first internal electrodes 12 and the second internal electrodes 13.

Meanwhile, the area where the first internal layers 14a1 and 15a1 are formed is limited to the end surfaces of the ceramic body 11 that are oriented in the X-axis direction, so that the thickness of the multi-layer ceramic capacitor 10 in the Z-axis direction can be suppressed.

3. Other Embodiments

While the embodiment of the present invention has been described, the present invention is not limited to the embodiment described above, and it should be appreciated that the present invention may be variously modified.

For example, in the embodiment described above, the multi-layer ceramic capacitor 10 has been described as an example of a ceramic electronic component, but the present invention can be applied to any other ceramic electronic components each including a pair of external electrodes. Examples of such ceramic electronic components include an inductor and a piezoelectric element.

What is claimed is:

1. A ceramic electronic component, comprising:
   a ceramic body; and
   an external electrode that is formed along a surface of the ceramic body and includes a tin layer as an outermost layer and an internal layer that is adjacent to the inside of the tin layer, the tin layer and the internal layer including dispersed pores, and the tin layer and the internal layer being formed of a columnar crystal.

2. The ceramic electronic component according to claim 1, wherein
   the internal layer is a copper layer.

3. The ceramic electronic component according to claim 1, wherein
   the tin layer is formed by sputtering.

4. The ceramic electronic component according to claim 1, wherein the pores are recessed in a concave manner from a surface of the outermost layer.

5. The ceramic electronic component according to claim 1, wherein the pores penetrate in a thickness direction of the tin layer.

* * * * *